(12) United States Patent
Yoon et al.

(10) Patent No.: US 12,013,356 B2
(45) Date of Patent: Jun. 18, 2024

(54) DIAGNOSIS OF CAUSE OF DEGRADATION OF LITHIUM SECONDARY BATTERY

(71) Applicant: LG Energy Solution, Ltd., Seoul (KR)

(72) Inventors: Hyo Jung Yoon, Daejeon (KR); Eun Ju Lee, Daejeon (KR); So Young Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 331 days.

(21) Appl. No.: 17/641,225

(22) PCT Filed: Apr. 28, 2021

(86) PCT No.: PCT/KR2021/005365
§ 371 (c)(1),
(2) Date: Mar. 8, 2022

(87) PCT Pub. No.: WO2021/241899
PCT Pub. Date: Dec. 2, 2021

(65) Prior Publication Data
US 2022/0393257 A1 Dec. 8, 2022

(30) Foreign Application Priority Data
May 27, 2020 (KR) .......................... 10-2020-0063393

(51) Int. Cl.
*G01N 23/2055* (2018.01)
*G01N 23/207* (2018.01)
(Continued)

(52) U.S. Cl.
CPC ........ *G01N 23/2055* (2013.01); *H01M 4/525* (2013.01); *G01N 23/207* (2013.01);
(Continued)

(58) Field of Classification Search
CPC ............................ G01N 23/2055; H01M 4/52
See application file for complete search history.

(56) References Cited

U.S. PATENT DOCUMENTS

| 6,517,974 B1 | 2/2003 | Kobayashi et al. |
| 2002/0055041 A1 | 5/2002 | Kobayashi et al. |

(Continued)

FOREIGN PATENT DOCUMENTS

| CN | 1225518 A | 8/1999 |
| CN | 103081212 A | 5/2013 |

(Continued)

OTHER PUBLICATIONS

Bartsch, Timo et al., Indirect state-of-charge determination of all-solid-state battery cells by X-ray diffraction, Royal Society of Chemistry, Aug. 2019, pp. 11223-11226, vol. 55.
(Continued)

*Primary Examiner* — Chih-Cheng Kao
(74) *Attorney, Agent, or Firm* — Lerner David LLP (57) ABSTRACT

Provided is a method of diagnosing the degradation of a lithium secondary battery in a non-destructive manner without disassembling the battery, which includes: obtaining, from X-ray diffraction (XRD) data obtained during first charging of the lithium secondary battery, a first graph showing the change of the c-axis d-spacing value of the layered positive electrode active material according to the number of moles of lithium ions deintercalated from the layered positive electrode active material during the charging; obtaining, from XRD data obtained during second charging of the lithium secondary battery, a second graph showing the change of the c-axis d-spacing value of the layered positive electrode active material according to the number of moles of lithium ions deintercalated from the layered positive electrode active material during the charging; and classifying a cause of degradation of the secondary battery by comparing the first graph and the second graph.

12 Claims, 2 Drawing Sheets

(51) Int. Cl.
  *H01M 4/525* (2010.01)
  *H01M 4/02* (2006.01)
  *H01M 4/505* (2010.01)
  *H01M 10/0525* (2010.01)
  *H01M 10/058* (2010.01)
  *H01M 10/44* (2006.01)
  *H01M 10/48* (2006.01)

(52) U.S. Cl.
  CPC .. *G01N 2223/056* (2013.01); *G01N 2223/611* (2013.01); *H01M 2004/028* (2013.01); *H01M 4/505* (2013.01); *H01M 10/0525* (2013.01); *H01M 10/058* (2013.01); *H01M 10/44* (2013.01); *H01M 10/48* (2013.01)

(56) References Cited

U.S. PATENT DOCUMENTS

| | | |
|---|---|---|
| 2003/0211396 A1 | 11/2003 | Kobayashi et al. |
| 2009/0305140 A1 | 12/2009 | Cho et al. |
| 2011/0039162 A1 | 2/2011 | Maeda |
| 2013/0076363 A1 | 3/2013 | Takahashi et al. |
| 2014/0028264 A1 | 1/2014 | Taniyama et al. |
| 2016/0123906 A1 | 5/2016 | Tessema et al. |
| 2017/0146610 A1 | 5/2017 | Cha et al. |
| 2020/0182943 A1 | 6/2020 | Lim et al. |
| 2020/0235419 A1 | 7/2020 | Chae et al. |
| 2020/0365875 A1* | 11/2020 | Choi ................. H01M 10/0525 |
| 2021/0083281 A1 | 3/2021 | Mikami et al. |
| 2022/0020983 A1* | 1/2022 | Lho ...................... H01M 4/525 |

FOREIGN PATENT DOCUMENTS

| | | | |
|---|---|---|---|
| CN | 103430371 A | 12/2013 | |
| CN | 108872869 A | 11/2018 | |
| CN | 110214387 A | 9/2019 | |
| EP | 0938147 A2 * | 8/1999 | ............. H01M 4/48 |
| EP | 3349276 A2 | 7/2018 | |
| JP | H08189907 A | 7/1996 | |
| JP | 2004349211 A | 12/2004 | |
| JP | 2007134049 A | 5/2007 | |
| JP | 2013131338 A | 7/2013 | |
| JP | 2017139089 A | 8/2017 | |
| JP | 6489529 B2 | 3/2019 | |
| KR | 20070077700 A | 7/2007 | |
| KR | 20070106476 A | 11/2007 | |
| KR | 20110016378 A | 2/2011 | |
| KR | 101355973 B1 | 1/2014 | |
| KR | 20160048585 A | 5/2016 | |
| KR | 101685609 B1 | 12/2016 | |
| KR | 20190073065 A | 6/2019 | |
| KR | 102032507 B1 | 10/2019 | |
| WO | 2018211375 A1 | 11/2018 | |

OTHER PUBLICATIONS

International Search Report for Application No. PCT/KR2021/005365 mailed Aug. 18, 2021, 2 pages.

Yao. C.P.K. et al., "Quantifying lithium concentration gradients in the graphite electrode of Li-ion cells using operando energy dispersive X-ray diffraction" Energy & Environmental Science, Nov. 2018, pp. 656-665, vol. 12, Issue 2.

Manishi. N. "Study on Lithium Insertion Compounds as Electrode Materials for Lithium Secondary Battery (Dissertation_Full text)" Kyoto University Research Information Repository, Jan. 1993, pp. 1-91.

Extended European Search Report for Application No. 21813068.0 dated Aug. 9, 2022, pp. 1-6.

* cited by examiner

DIAGNOSIS OF CAUSE OF DEGRADATION OF LITHIUM SECONDARY BATTERY

CROSS-REFERENCE TO RELATED APPLICATION

This application is a national phase entry under 35 U.S.C. § 371 of International Application No. PCT/KR2021/005365, filed on Apr. 28, 2021, which claims priority to Korean Patent Application No. 10-2020-0063393, filed on May 27, 2020, the disclosures of which are incorporated herein by reference in its entirety.

TECHNICAL FIELD

The present invention relates to a method of diagnosing a cause of degradation of a lithium secondary battery. Specifically, the present invention relates to a method of diagnosing a cause of degradation of a lithium secondary battery in a non-destructive manner using X-ray diffraction (XRD) data measured without disassembling the battery.

BACKGROUND ART

Due to developments in technology and increased demand for mobile devices, the demand for secondary batteries as an energy source is rapidly growing. Among these secondary batteries, lithium secondary batteries having a high energy density and a high voltage, a long cycle lifespan, and a low self-discharge rate have been commercialized and are widely used. In particular, as electric vehicles are rapidly becoming popular in recent years, the development of high-energy batteries that can be used as power sources for medium-to-large sized devices is becoming more important.

Lithium transition metal composite oxides have been used as positive electrode active materials for the above-described lithium secondary batteries, and among these, lithium cobalt composite metal oxides such as $LiCoO_2$, which have a high operating voltage and excellent capacity characteristics, have been mainly used. However, $LiCoO_2$ has an unstable crystal structure due to lithium deintercalation and thus has very poor thermal properties. In addition, since $LiCoO_2$ is expensive, it has limitations in mass use thereof as a power source in fields such as electric vehicles.

As an alternative for $LiCoO_2$, a lithium manganese composite metal oxide ($LiMnO_2$, $LiMn_2O_4$, or the like), a lithium iron phosphate compound ($LiFePO_4$ or the like), or a lithium nickel composite metal oxide ($LiNiO_2$ or the like) was developed. Among these, there have been particularly active research efforts to develop lithium nickel composite metal oxides which can easily implement a high-capacity battery due to having a high reversible capacity of about 200 mAh/g. However, the $LiNiO_2$ has problems such as low thermal stability as compared to $LiCoO_2$, and when an internal short circuit occurs in a charged state due to pressure applied from the outside or the like, the positive electrode active material itself is decomposed, causing the battery to rupture and ignite. Accordingly, as a way to improve the low thermal stability while retaining the excellent reversible capacity of $LiNiO_2$, a lithium transition metal oxide in which a part of nickel (Ni) is substituted with cobalt (Co), manganese (Mn), or aluminum (Al) has been developed.

However, in the case of the above-described lithium transition metal oxide in which a part of Ni is substituted with Co, Mn, or Al, when the Ni content is increased to 60 mol % or more to achieve high energy by improving capacity characteristics, there is a problem that lithium present in the positive electrode active material is deintercalated at high potential and forms a new phase, and the structural stability of the positive electrode active material is degraded by this phase transition, which leads to the degradation of the battery.

Conventionally, in order to diagnose a specific cause of battery degradation, such as the loss of available lithium, the loss of positive electrode capacity, the loss of negative electrode capacity, or the like, the battery had to be disassembled, and positive and negative electrodes separated therefrom had to be reassembled into half cells, which were then analyzed for the verification of the cause. However, in this case, there were problems that the diagnosis of battery degradation was time-consuming and expensive, and the disassembled battery could not be reused.

Therefore, there is a need to develop a method of diagnosing a cause of degradation of a secondary battery which is capable of classifying and quantifying a cause of battery degradation without disassembling the secondary battery.

DISCLOSURE

Technical Problem

The present invention is directed to providing a method of diagnosing a cause of degradation of a lithium secondary battery in a non-destructive manner, which is capable of diagnosing a cause of degradation without disassembling the battery.

Technical Solution

One aspect of the present invention provides a method of diagnosing a cause of degradation of a lithium secondary battery, which includes: (A) manufacturing a lithium secondary battery including a positive electrode including a layered positive electrode active material and a negative electrode; (B) obtaining, from XRD data obtained during first charging of the lithium secondary battery, a first graph showing the change of the c-axis d-spacing value of the layered positive electrode active material according to the number of moles of lithium ions deintercalated from the layered positive electrode active material during the charging; (C) obtaining, from XRD data obtained during second charging of the lithium secondary battery, a second graph showing the change of the c-axis d-spacing value of the layered positive electrode active material according to the number of moles of lithium ions deintercalated from the layered positive electrode active material during the charging; and (D) classifying a cause of degradation of the secondary battery by comparing the first graph and the second graph.

Advantageous Effects

According to the present invention, it is possible to classify and quantify a cause of degradation of a secondary battery using XRD data measured without disassembling the battery.

According to the diagnostic method of the present invention, it is possible to determine whether the degradation of a secondary battery is due to the loss of available lithium, the loss of positive electrode capacity, or both the loss of available lithium and the loss of positive electrode capacity and quantify the loss of available lithium and the loss of positive electrode capacity without disassembling the battery.

That is, it is possible to diagnose a cause of degradation of a lithium secondary battery in a simple and non-destructive manner.

BEST MODE

Hereinafter, the present invention will be described in more detail to facilitate understanding of the present invention.

Terms and words used in this specification and the claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

The terms used in this specification have been used only for the purpose of describing exemplary embodiments and are not intended to limit the present invention. In the present specification, singular expressions include plural expressions unless the context clearly indicates otherwise.

It will be understood that terms such as "comprises," "comprising," "includes," "including," "has" or "having," when used in the present specification, specify the presence of stated features, numbers, steps, components, or combinations thereof and do not preclude the possibility of the presence or addition of one or more other features, numbers, steps, components, or combinations thereof.

<Method of Diagnosing Cause of Degradation of Lithium Secondary Battery>

A method of diagnosing a cause of degradation of a lithium secondary battery according to the present invention includes: (A) manufacturing a lithium secondary battery including a positive electrode including a layered positive electrode active material and a negative electrode; (B) obtaining, from XRD data obtained during first charging of the lithium secondary battery, a first graph showing the change of the c-axis d-spacing value of the layered positive electrode active material according to the number of moles of lithium ions deintercalated from the layered positive electrode active material during the charging; (C) obtaining, from XRD data obtained during second charging of the lithium secondary battery, a second graph showing the change of the c-axis d-spacing value of the layered positive electrode active material according to the number of moles of lithium ions deintercalated from the layered positive electrode active material during the charging; and (D) classifying a cause of degradation of the secondary battery by comparing the first graph and the second graph.

Figure 1A:
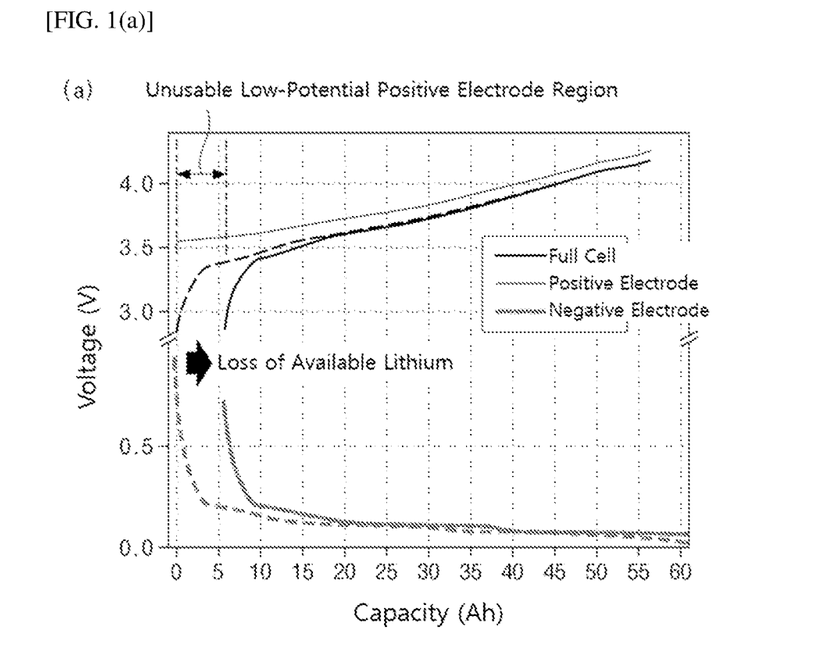
FIGS. 1(a) and 1(b) shows diagrams illustrating charge potential profiles of full cells and positive electrode half cells and negative electrode half cells manufactured using positive electrodes and negative electrodes obtained by disassembling the full cells, which were obtained to diagnose a cause of degradation of the lithium secondary batteries by a conventional method.
Figure 1B:
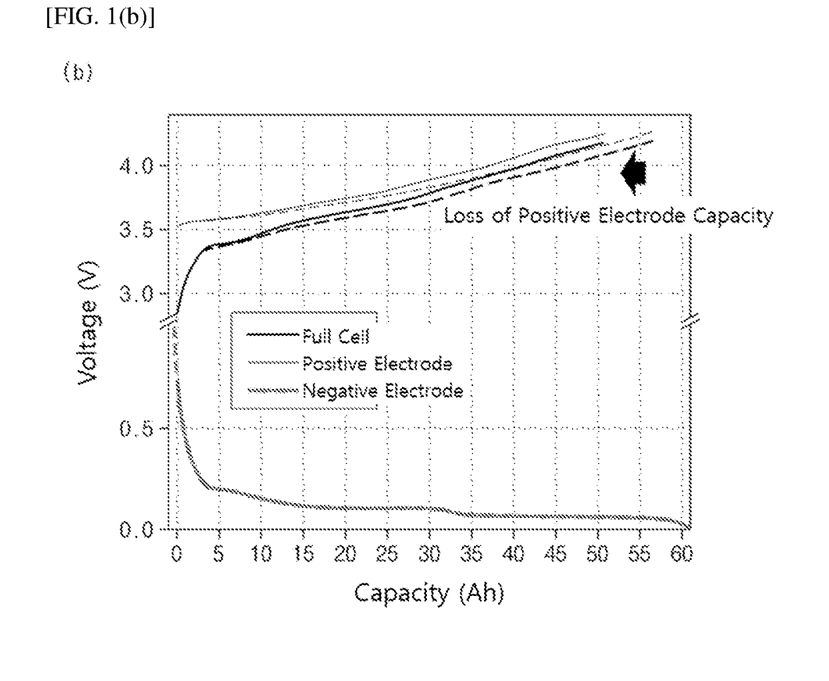

Conventionally, it was not possible to identify a cause of degradation of a battery using only a charge potential profile of a full cell, and a cause of degradation of the battery could be identified only by disassembling the full cell and reassembling a positive electrode and a negative electrode obtained therefrom into separate half cells and verifying the cause by analyzing the half cells. FIGS. 1(a) and 1(b) shows diagrams illustrating charge potential profiles of full cells and positive electrode half cells and negative electrode half cells manufactured using positive electrodes and negative electrodes obtained by disassembling the full cells, which were obtained to diagnose a cause of degradation of the lithium secondary batteries by a conventional method. The full cell of FIG. 1(a) and the full cell of FIG. 1(b) are different full cells.

Referring to the full-cell charge potential profiles shown in FIGS. 1(a) and 1(b), from the fact that charge capacities represented by solid lines (charge capacities of degraded batteries) decreased as compared to charge capacities represented by dashed lines (initial charge capacities of batteries), it can be seen that the degradation of the batteries has progressed. However, a cause of the degradation of the batteries cannot be identified using only the full-cell charge potential profiles. Therefore, positive electrodes and negative electrodes obtained by disassembling the full cells were assembled into half cells, and charge potential profiles of the positive electrode half cells and negative electrode half cells were obtained.

Referring to the positive electrode half-cell charge profiles shown in FIG. 1(a), from the fact that there is no difference between positive electrode half-cell charge profiles represented by a dashed line and a solid line, it can be seen that the degradation of the battery is not due to the loss of positive electrode capacity. Therefore, in order to identify a cause of degradation of the battery, in FIG. 1(a), a full-cell charge potential profile represented by a solid line and a negative electrode half-cell charge profile represented by a solid line are horizontally shifted (all the amount of loss of full cell capacity is reflected in the negative electrode half cell profile) in the x-axis direction as much as the amount of loss of full cell capacity, and it can be confirmed that the degradation of the battery is due to the loss of available lithium. In addition, it can be seen that due to the degradation occurring due to the loss of reversible lithium ions due to a side reaction consuming lithium ions, an unusable low-potential positive electrode region occurred.

Referring to the positive electrode half-cell charge profiles shown in FIG. 1(b), from the fact that a positive electrode half-cell profile represented by a solid line does not overlap with a positive electrode half-cell profile represented by a dashed line, it can be confirmed that the degradation of the battery is due to the loss of positive electrode capacity.

As described above, conventionally, in order to diagnose a specific cause of battery degradation, the battery had to be disassembled, and positive and negative electrodes separated therefrom had to be reassembled into half cells, which were then analyzed for the verification of the cause, and thus, there were problems that the diagnosis of battery degradation was time-consuming and expensive, and the disassembled battery could not be reused.

The present invention relates to a method capable of classifying a cause of degradation of a lithium secondary battery without disassembling the full cell, by determining the c-axis d-spacing value of a layered positive electrode active material based on XRD data. The method of diagnosing a cause of degradation of a lithium secondary battery according to the present invention is a non-destructive diagnosis method, and thus, as long as the lithium secondary battery is not completely degraded, there is an advantage that the secondary battery can be reused after the cause of degradation of the lithium secondary battery is identified.

Hereinafter, each step of the present invention will be described in more detail.

Step (A)

First, the present invention includes step (A) of manufacturing a lithium secondary battery including: a positive electrode including a layered positive electrode active material; and a negative electrode.

Specifically, step (A) may be a step of manufacturing a lithium secondary battery including: a positive electrode including a layered positive electrode active material; a negative electrode present opposite the positive electrode; a separator interposed between the positive electrode and the negative electrode; and an electrolyte.

The positive electrode of the present invention may be manufactured by forming a positive electrode active material layer by applying a composition for forming a positive electrode including a layered positive electrode active material, a binder, a conductive material, a solvent, and the like onto a positive electrode current collector. In addition, the composition for forming a positive electrode may optionally further include a dispersant if necessary.

In the present invention, in order to achieve a secondary battery with high energy density, the layered positive electrode active material may be a lithium transition metal oxide including Ni at 60 mol % or more relative to the total number of moles of transition metals excluding lithium. Specifically, according to the present invention, the layered positive electrode active material may be represented by the following Chemical Formula 1.

$$Li_{1+a}Ni_xCo_yM_zO_2 \quad \text{[Chemical Formula 1]}$$

In the above Chemical Formula 1, $0 \leq a \leq 0.3$, $0.6 \leq x \leq 1.0$, $0 \leq y \leq 0.2$, $0 \leq z \leq 0.2$, and $x+y+z=1$, and M may be one or more selected from among Mn and Al.

In the above Chemical Formula 1, M may be an element substituted at a transition metal site in an oxide represented by Chemical Formula 1.

$1+a$ represents the molar ratio of lithium in an oxide represented by the above Chemical Formula 1, and may be $0 \leq a \leq 0.3$ and preferably $0 \leq a \leq 0.2$.

x represents the molar ratio of Ni in an oxide represented by the above Chemical Formula 1, and may be $0.6 \leq x \leq 1.0$ and preferably $0.8 \leq x \leq 1.0$.

y represents the molar ratio of Co in an oxide represented by the above Chemical Formula 1, and may be $0 \leq y \leq 0.2$ and preferably $0 \leq y \leq 0.15$.

z represents the molar ratio of M in an oxide represented by the above Chemical Formula 1, and may be $0 \leq z \leq 0.2$ and preferably $0 \leq z \leq 0.15$.

When the layered positive electrode active material includes Ni at 60 mol % or more, specifically, 80 mol % or more, relative to the total number of moles of transition metals excluding lithium, that is, when the layered positive electrode active material has high Ni content, in particular, as lithium ions present in the positive electrode active material are deintercalated at a high potential, the phase of the positive electrode active material may be changed. That is, the structural stability of the positive electrode active material may be degraded, and this may lead to the degradation of a positive electrode and, ultimately, the degradation (performance degradation) of a lithium secondary battery. The method of diagnosing a cause of degradation of a lithium secondary battery according to the present invention is characterized in that it is capable of diagnosing the cause of the above-described degradation of a lithium secondary battery without disassembling the full cell.

In the positive electrode, the positive electrode current collector is not particularly limited as long as it does not cause a chemical change in a battery and has conductivity, and for example, stainless steel, aluminum, nickel, titanium, calcined carbon, or aluminum or stainless steel whose surface has been treated with carbon, nickel, titanium, silver, or the like may be used. In addition, the positive electrode current collector may typically have a thickness of 3 μm to 500 μm, and the current collector may have fine irregularities formed in a surface thereof to increase the adhesion of the positive electrode active material. The positive electrode current collector may be used in any of various forms such as a film, a sheet, a foil, a net, a porous material, a foam, a non-woven fabric, and the like.

The binder serves to improve adhesion between the positive electrode active material particles and between the positive electrode active material and the positive electrode current collector. Specific examples thereof include polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated-EPDM, styrene-butadiene rubber (SBR), fluororubber, or various copolymers thereof, which may be used alone or in a combination of two or more thereof.

The conductive material is used for imparting conductivity to an electrode and can be used without particular limitation as long as it does not cause a chemical change in a battery being manufactured and has electron conductivity. Specific examples thereof include: graphite such as natural graphite or artificial graphite; carbon black such as acetylene black, Ketjen black, channel black, furnace black, lamp black, or thermal black; a carbon-based material such as a carbon fiber; a metal powder or metal fiber such as copper, nickel, aluminum, or silver; a conductive whisker such as zinc oxide or potassium titanate; a conductive metal oxide such as titanium oxide; and a conductive polymer such as a polyphenylene derivative, which may be used alone or in a combination of two or more thereof.

The dispersant can be used without particular limitation as long as it is a material used as a dispersant for a positive electrode, and for example, an aqueous dispersant or an organic dispersant may be selectively used according to need. Preferably, examples of the dispersant include a cellulose-based compound, polyalkylene oxide, polyvinyl alcohol, polyvinylpyrrolidone, polyvinyl acetal, polyvinyl ether, polyvinyl sulfonic acid, polyvinyl chloride (PVC), PVDF, chitosan, starch, amylose, polyacrylamide, poly(N-isopropylacrylamide), poly(N,N-dimethylacrylamide), polyethyleneimine, polyoxyethylene, poly(2-methoxyethoxyethylene), poly(acrylamide-co-diallyldimethylammonium chloride), an acrylonitrile/butadiene/styrene (ABS) polymer, an acrylonitrile/styrene/acrylic ester (ASA) polymer, a combination of an ASA polymer and propylene carbonate, a styrene/acrylonitrile (SAN) copolymer, a methyl methacrylate/acrylonitrile/butadiene/styrene (MABS) polymer, SBR, nitrile butadiene rubber, fluororubber, and the like, which may be used alone or in a combination of two or more thereof. Hydrogenated nitrile butadiene rubber (H-NBR) may be used. When the positive electrode active material layer additionally includes the dispersant, the dispersibility of components of the positive electrode active material layer, particularly, the conductive material, may be increased, but the present invention is not limited thereto.

The solvent may be a solvent commonly used in the art, for example, dimethyl sulfoxide (DMSO), isopropyl alcohol, N-methylpyrrolidone (NMP), acetone, water, or the like, which may be used alone or in a combination of two or more thereof. The usage amount of the solvent is sufficient if it can dissolve or disperse the positive electrode active material, the conductive material, and the binder in consideration of the coating thickness of a slurry and a production yield and, at a later point in time, achieve a viscosity capable of exhibiting excellent thickness uniformity when the slurry is applied to manufacture a positive electrode.

The negative electrode of the present invention may be manufactured by forming a negative electrode active material layer by applying a composition for forming a negative electrode including a negative electrode active material, a binder, a conductive material, a solvent, and the like onto a negative electrode current collector. In addition, the composition for forming a negative electrode may optionally further include a dispersant as necessary.

As the negative electrode active material, a compound capable of reversible intercalation and deintercalation of lithium may be used. Preferably, the negative electrode includes a silicon-based negative electrode active material exhibiting high capacity characteristics. In addition, the negative electrode active material may additionally include a carbon-based negative electrode active material as well as a silicon-based negative electrode active material. For example, when the negative electrode active material includes a silicon-based negative electrode active material and a carbon-based negative electrode active material, high capacity characteristics are exhibited, and at the same time, irreversible capacity can be reduced as compared to when only the silicon-based negative electrode active material is included.

In the negative electrode, the negative electrode current collector is not particularly limited as long as it does not cause a chemical change in a battery and has conductivity, and for example, copper, stainless steel, aluminum, nickel, titanium, calcined carbon, or aluminum or stainless steel whose surface has been treated with carbon, nickel, titanium, silver, or the like may be used. Specifically, a transition metal capable of effectively absorbing carbon, such as copper or nickel, may be used as a current collector. In addition, the negative electrode current collector may typically have a thickness of 3 μm to 500 μm, and the current collector may have fine irregularities formed in a surface thereof to increase the adhesion of the negative electrode active material. The negative electrode current collector may be used in any of various forms such as a film, a sheet, a foil, a net, a porous material, a foam, a non-woven fabric, and the like.

The conductive material, binder, solvent, or dispersant included in the composition for forming a negative electrode may be used without particular limitation as long as it can typically be used in a composition for forming an electrode. For example, the conductive material, binder, solvent, or dispersant described in the above-described composition for forming a positive electrode may be used.

Meanwhile, in the lithium secondary battery, the separator is used for separating the negative electrode and the positive electrode and providing a passage for lithium ion migration, and any separator commonly used in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film formed of a polyolefin-based polymer such as an ethylene homopolymer, a propylene homopolymer, an ethylene/butene copolymer, an ethylene/hexene copolymer, or an ethylene/methacrylate copolymer or a stacked structure having two or more layers thereof, may be used. In addition, a common porous non-woven fabric, for example, a non-woven fabric made of high-melting-point glass fiber, a polyethylene terephthalate fiber, or the like, may be used. Also, in order to ensure heat resistance or mechanical strength, a coated separator that includes a ceramic component or polymer material and is optionally in a single-layer or multi-layer structure may be used.

In addition, examples of the electrolyte used in the present invention may include an organic liquid electrolyte, an inorganic liquid electrolyte, a solid polymer electrolyte, a gel-type polymer electrolyte, an inorganic solid electrolyte, a molten-type inorganic electrolyte, and the like which are usable for manufacturing a lithium secondary battery, but the present invention is not limited thereto.

Specifically, the electrolyte may include an organic solvent and a lithium salt.

As the organic solvent, any organic solvent that can serve as a medium through which ions involved in an electrical reaction of a battery can move may be used without particular limitation. Specifically, as the organic solvent, an ester-based solvent such as methyl acetate, ethyl acetate, γ-butyrolactone, or ε-caprolactone, an ether-based solvent such as dibutyl ether or tetrahydrofuran, a ketone-based solvent such as cyclohexanone, an aromatic hydrocarbon-based solvent such as benzene or fluorobenzene, a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC), an alcohol-based solvent such as ethyl alcohol or isopropyl alcohol, a nitrile such as R-CN (R is a C2-C20 hydrocarbon group having a linear, branched, or cyclic structure and may include a double-bonded aromatic ring or an ether bond), an amide such as dimethylformamide, a dioxolane such as 1,3-dioxolane, a sulfolane, or the like may be used. Among these, a carbonate-based solvent is preferable, and a combination of a cyclic carbonate having high ionic conductivity and a high dielectric constant, which is capable of improving the charging/discharging performance of a battery (e.g., EC, PC, or the like), and a linear carbonate-based compound having low viscosity (e.g., EMC, DMC, DEC, or the like) is more preferable.

As the lithium salt, any compound capable of providing lithium ions used in a lithium secondary battery may be used without particular limitation. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used.

In the electrolyte, in addition to the above-described electrolyte components, one or more additives, for example, a haloalkylene carbonate-based compound (e.g., difluoroethylene carbonate), pyridine, triethyl phosphite, triethanolamine, a cyclic ether, ethylenediamine, n-glyme, hexamethylphosphate triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, aluminum trichloride, and the like may be included for the purpose of enhancing the lifetime characteristics of a battery, suppressing a reduction in battery capacity, enhancing the discharge capacity of a battery, and the like.

Steps (B) and (C)

The present invention includes step (B) of obtaining, from XRD data obtained during first charging of the lithium secondary battery, a first graph showing the change of the c-axis d-spacing value of the layered positive electrode active material according to the number of moles of lithium ions deintercalated from the layered positive electrode active material during the charging.

In addition, the present invention includes step (C) of obtaining, from XRD data obtained during second charging of the lithium secondary battery, a second graph showing the change of the c-axis d-spacing value of the layered positive electrode active material according to the number of moles of lithium ions deintercalated from the layered positive electrode active material during the charging.

In the present invention, the first charging means initial charging. That is, the first charging refers to initial charging performed immediately after the manufacture of a lithium secondary battery.

Since the present invention relates to a method of diagnosing the degradation of a full-cell lithium secondary battery, in the present invention, the second charging may be charging performed after discharging the lithium secondary battery subjected to the first charging and subsequently repeatedly charging and discharging the lithium secondary battery for one or more cycles. In addition, the second charging may be charging performed after discharging the lithium secondary battery subjected to the first charging and subsequently storing the lithium secondary battery for a long period of time at a temperature of −20° C. to 70° C.

According to the method of diagnosing a cause of degradation of a lithium secondary battery of the present invention, it is possible to identify a cause of battery degradation in a simple and non-destructive manner, by repeatedly charging and discharging the lithium secondary battery within a driving voltage range of the battery, or by storing the lithium secondary battery for a long period of time after the initial charging and discharging of the lithium secondary battery. Therefore, even after diagnosing the cause of deterioration of the lithium secondary battery, the secondary battery can be reused as long as the secondary battery is not completely degraded.

In the present invention, the first charging and the second charging may be performed in a voltage range of 2.5 V to 4.2 V. Also, the one or more cycles of repeated charging and discharging may be performed in a voltage range of 2.5 V to 4.2 V.

In the present invention, the XRD data may be obtained using a transmission XRD analyzer. For example, the XRD data may be obtained by carrying out measurement using a transmission XRD analyzer manufactured by Bruker or Malvern Panalytical Ltd. and an Ag—Kα (0.56 Å) target under the conditions of a voltage of 50 kV and a current of 25 mA.

In the present invention, the lithium secondary battery is subjected to the first charging (initial charging) or the second charging while a region where the layered positive electrode active material is present is irradiated with X-rays, diffracted X-rays are detected, and a degree of degradation of the secondary battery is determined using the detected diffracted X-rays. The present invention uses a phenomenon that when a lithium secondary battery is charged, a distance between crystal planes of a layered positive electrode active material changes as the deintercalation of lithium ions proceeds.

Specifically, a d-spacing value, which is a c-axis distance between crystal planes of a layered positive electrode active material, may be obtained from XRD data obtained during the first charging or the second charging of the lithium secondary battery, and a graph may be plotted for the d-spacing value with respect to the number of moles of lithium ions deintercalated during the first charging or the second charging, and through the comparison of a first graph showing the change of the d-spacing value according to the number of moles of lithium ions deintercalated during the first charging and a second graph showing the change of the d-spacing value according to the number of moles of lithium ions deintercalated during the second charging, the degree of degradation of the secondary battery can be determined. Specific details related to determining the degree of degradation of the secondary battery through the comparison of the graphs will be described in more detail in step (D).

In the present invention, the above-described d-spacing value may specifically be a d-spacing value in the (003) plane of the layered positive electrode active material. For example, the d-spacing value may mean the length of a long axis of a hexagonal (space group=R3m) unit cell. The unit cell refers to the smallest repeating structure having the arrangement of transition metal layer/oxygen layer/lithium layer in the positive electrode active material.

Step (D)

The present invention includes step (D) of classifying a cause of degradation of the secondary battery by comparing the first graph and the second graph.

In the present invention, the cause of degradation of the secondary battery may be one or more among the loss of available lithium and the loss of positive electrode capacity. That is, step (D) may include identifying, through the comparison of the first and second graphs, whether the degradation of the secondary battery is due to the loss of available lithium, the loss of positive electrode capacity, or both the loss of available lithium and the loss of positive electrode capacity, and classifying the cause of the degradation.

In the present invention, step (D) may include classifying the cause of degradation of the secondary battery as the loss of available lithium when the maximum value of the number of moles of deintercalated lithium ions in the second graph is smaller than the maximum value of the number of moles of deintercalated lithium ions in the first graph, and, after horizontally shifting the second graph in the x-axis direction so that the number of moles of deintercalated lithium ions corresponding to the maximum c-axis d-spacing value of the layered positive electrode active material in the second graph is the same as the number of moles of deintercalated lithium ions corresponding to the maximum c-axis d-spacing value of the layered positive electrode active material in the first graph, classifying the cause of degradation of the secondary battery as the loss of positive electrode capacity when the sum of the maximum number of moles of deintercalated lithium ions in the second graph and the degree by which the second graph was horizontally shifted (in the x-axis direction) is greater than the maximum number of moles of deintercalated lithium ions in the first graph.

Meanwhile, in regard to the occurrence of an unusable low-potential positive electrode region due to the degradation occurring due to the loss of reversible lithium ions due to a side reaction consuming lithium ions, it can be seen that the above-described unusable low-potential positive electrode region occurs when the number of moles of deintercalated lithium ions corresponding to the maximum c-axis d-spacing value of the layered positive electrode active material in the second graph is smaller than the number of moles of deintercalated lithium ions corresponding to the maximum c-axis d-spacing value of the layered positive electrode active material in the first graph.

In the present invention, step (D) may include quantifying the amount of loss of available lithium as a value obtained by subtracting the maximum number of moles of deintercalated lithium ions in the second graph from the maximum number of moles of deintercalated lithium ions in the first graph. The amount of loss of available lithium is a value obtained by subtracting the maximum number of moles of deintercalated lithium ions in the second graph from the maximum number of moles of deintercalated lithium ions in the first graph. The maximum number of moles of deintercalated lithium ions in the first graph or the second graph is the maximum amount of available lithium during the first charging or the second charging. That is, the amount of loss of available lithium determined through the comparison of the first graph and the second graph is a value obtained by subtracting the maximum amount of available lithium during the second charging from the maximum amount of available lithium during the first charging, and through this, the degree of degradation of the battery can be determined.

In addition, step (D) may include quantifying the balance shift of the positive electrode and the negative electrode based on the degree by which the second graph was horizontally shifted (in the x-axis direction so that the number of moles of deintercalated lithium ions corresponding to the maximum c-axis d-spacing value of the layered positive electrode active material in the second graph is the same as the number of moles of deintercalated lithium ions corresponding to the maximum c-axis d-spacing value of the layered positive electrode active material in the first graph). In the present specification, the above-described balance shift means that the degradation occurred due to the loss of reversible lithium ions due to a side reaction consuming lithium ions. The balance shift refers to the degree to which the second graph was horizontally shifted, and is obtained by subtracting the number of moles of deintercalated lithium ions corresponding to the maximum d-spacing value in the second graph from the number of moles of deintercalated lithium ions corresponding to the maximum d-spacing value in the first graph. From the balance shift, it can be seen that excessive charging (over delithiation) occurs as the operating range of the positive electrode is changed.

In addition, step (D) may include quantifying the amount of loss of positive electrode capacity. The amount of loss of positive electrode capacity may be quantified as a value obtained by subtracting the maximum number of moles of deintercalated lithium ions in the first graph from the above-described sum of the maximum number of moles of deintercalated lithium ions in the second graph and the degree by which the second graph was horizontally shifted (in the x-axis direction).

That is, according to the present invention, it may be possible to quantify a cause of degradation of the secondary battery.

In the method of diagnosing a cause of degradation of a lithium secondary battery according to the present invention, when the rate of loss of available lithium according to the following Equation 1 is 14% or more, it may be determined that the degradation of the lithium secondary battery is due to the loss of available lithium.

Rate of loss of available lithium=(Amount of loss of available lithium)/(Maximum number of moles of deintercalated lithium ions in first graph)× 100   [Equation 1]

End-of-life (EOL), which is defined as the lifetime of a lithium secondary battery, generally refers to a time point at which the capacity of the battery reaches 80% of the initial capacity of the battery. That is, when the capacity of the lithium secondary battery is reduced by 20% as compared to the initial capacity, it can be considered that the lithium secondary battery has been degraded.

While the degradation of a secondary battery may be the loss of available lithium due to side reactions, the degradation of a positive electrode due to a reduction in a positive electrode reaction area, the degradation of a negative electrode due to a reduction in a negative electrode reaction area, or the like, the inventors of the present invention have obtained the c-axis d-spacing value of a layered positive electrode active material based on XRD data without disassembling the full cell and thereby confirmed that in the case of degradation of a secondary battery, among a 20% capacity reduction, approximately 14% was due to the loss of available lithium.

Therefore, according to the method of diagnosing a cause of degradation of a lithium secondary battery according to the present invention, it is possible to confirm a decrease in the amount of available lithium, a decrease in positive electrode capacity, and the like even without disassembling a secondary battery after charging and discharging the battery, and accordingly, it is possible to identify the cause of degradation of the lithium secondary battery in a simple and non-destructive manner. Therefore, the lithium secondary battery can be reused even after diagnosing the cause of degradation of the secondary battery.

MODE OF THE INVENTION

Hereinafter, the present invention will be described in detail by way of exemplary embodiments. However, the exemplary embodiments of the present invention can be implemented in various modified forms, and the scope of the present invention should not be construed as being limited to the exemplary embodiments described below. The exemplary embodiments of the present invention are provided to more fully describe the present invention to those skilled in the art.

EXAMPLES

Example 1

$LiNi_{0.8}Co_{0.1}Mn_{0.1}O_2$ as a positive electrode active material, a carbon black conductive material, a dispersant, and a PVDF binder were mixed, in a weight ratio of 97.5:1:0.15:1.35, in an NMP solvent, and thus a composition for forming a positive electrode was obtained. The composition for forming a positive electrode was applied onto an aluminum foil, dried, and roll-pressed, and thus a positive electrode was obtained.

Meanwhile, a 90:10 (w/w) mixture of graphite and SiO was used as a negative electrode active material, and the negative electrode active material, carbon black, a carbon nanotube conductive material, and a binder were mixed in a weight ratio of 96:0.5:0.1:3.4 and then added to a solvent, and thus a composition for forming a negative electrode was obtained. The composition for forming a negative electrode was applied onto a 6 μm-thick copper current collector, dried, and roll-pressed, and thus a negative electrode was obtained.

The positive electrode and negative electrode manufactured in the above and a safety reinforced separator (SRS)

were stacked together to form an electrode assembly. The electrode assembly was placed in a battery case, and an electrolyte prepared by dissolving an electrolyte salt in a mixed solvent including EC, PC, and EMC in a volume ratio of 25:5:70 was injected into the battery case, and thus a lithium secondary battery was obtained.

The lithium secondary battery manufactured as described above was mounted on a transmission XRD analyzer (manufactured by Bruker) and initially charged at 0.025 C cut-off to 4.2 V with a constant current of 0.05 C while being irradiated with X-rays, and thus the XRD data of the (003) plane corresponding to the interlayer spacing of the positive electrode active material was obtained. (The measurement was carried out under the conditions of a voltage of 50 kV and a current of 25 mA using an Ag—K$\alpha$ (0.56 Å) target.)

The d-spacing value of the (003) plane of the positive electrode active material was determined based on the above-described XRD data obtained from the (003) plane, and from this, a first graph showing a change of the c-axis d-spacing value of the layered positive electrode active material according to the number of moles of lithium ions deintercalated from the layered positive electrode active material during the initial charging was obtained. The first graph is shown in FIG. 2(a).

Subsequently, the lithium secondary battery, which was initially charged, was stored at 60° C. for six weeks. After storing the lithium secondary battery at 60° C. for six weeks, the lithium secondary battery was mounted on a transmission XRD analyzer (manufactured by Bruker), and the lithium secondary battery was subjected to second charging at 0.025 C cut-off to 4.2 V with a constant current of 0.05 C while being irradiated with X-rays, and thus the XRD data of the (003) plane corresponding to the interlayer spacing of the positive electrode active material was obtained. (The measurement was carried out under the conditions of a voltage of 50 kV and a current of 25 mA using an Ag—K$\alpha$ (0.56 Å) target.)

The d-spacing value of the (003) plane of the positive electrode active material was determined based on the above-described XRD data obtained from the (003) plane, and from this, a second graph showing a change of the c-axis d-spacing value of the layered positive electrode active material according to the number of moles of lithium ions deintercalated from the layered positive electrode active material during the second charging was obtained. The second graph is shown in FIG. 2(a).

Figure 2A:
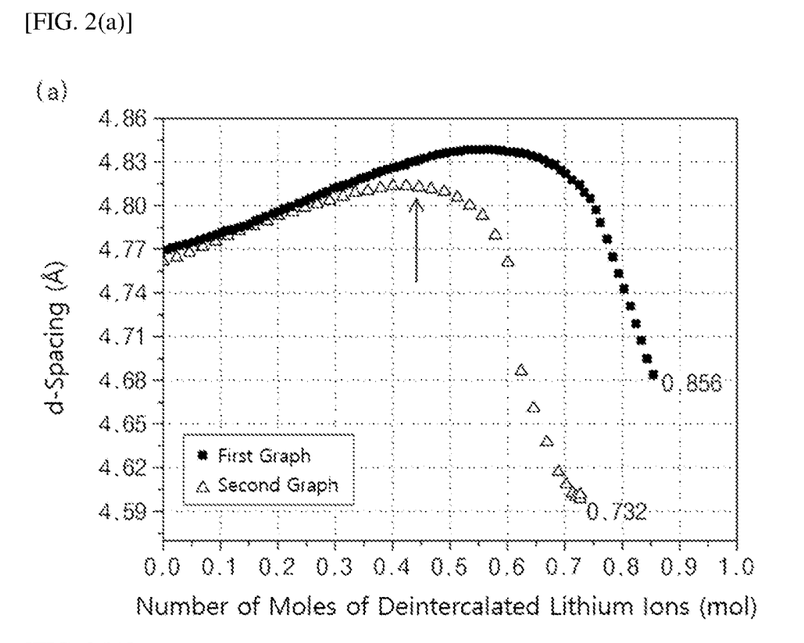
FIGS. 2(a) and 2(b) shows diagrams illustrating the change of the c-axis d-spacing value of a layered positive electrode active material of a secondary battery of Example 1 according to the number of moles of lithium ions deintercalated from the layered positive electrode active material during first charging or second charging.

The cause of degradation of the lithium secondary battery of Example 1 was identified through the comparison of the first and second graphs of FIG. 2(a).

Specifically, from the difference (0.124 mol) between the maximum number of moles of deintercalated lithium ions in the first graph of FIG. 2(a) (0.856 mol) and the maximum number of moles of deintercalated lithium ions in the second graph (0.732 mol), it can be seen that the loss of available lithium was the cause of degradation of the lithium secondary battery, and that the amount of loss of available lithium was 0.124 mol. In addition, it can be seen that the rate of loss of available lithium was 14.5%.

Figure 2B:
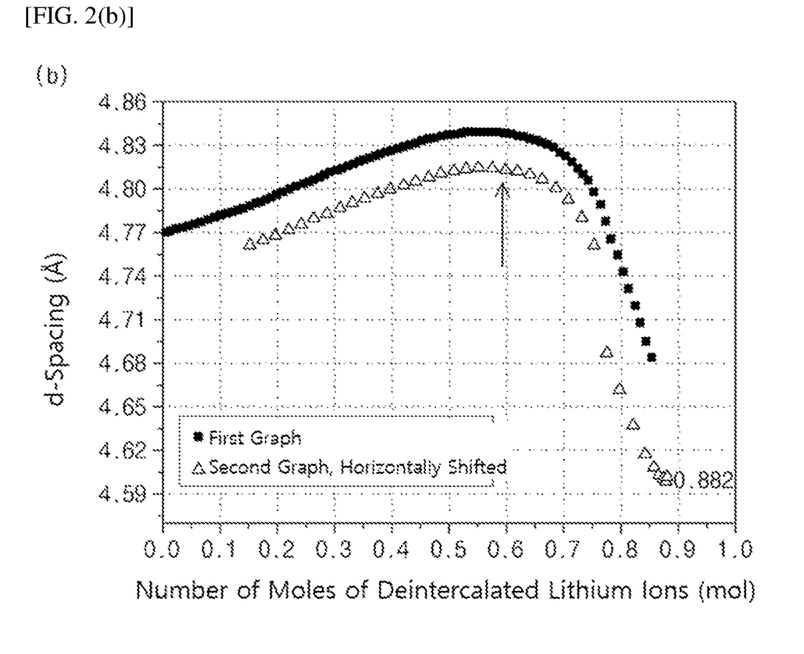

Meanwhile, FIG. 2(b) shows a graph obtained by horizontally shifting the second graph of FIG. 2(a) by about 0.15 in the x-axis direction so that the number of moles of deintercalated lithium ions corresponding to the maximum c-axis d-spacing value of the layered positive electrode active material in the second graph is the same as the number of moles of deintercalated lithium ions corresponding to the maximum c-axis d-spacing value of the layered positive electrode active material in the first graph of FIG. 2(a). From the fact that the degree by which the second graph was horizontally shifted, that is, a balance shift, was more than 0, it can be seen that excessive charging (over delithiation) occurred as the operating range of the positive electrode of the secondary battery of Example 1 was changed.

In addition, from the fact that the maximum number of moles of deintercalated lithium ions in the second graph of FIG. 2(b) (0.882 mol=0.732 mol+0.15 mol (balance shift)) was larger than the maximum number of moles of deintercalated lithium ions in the first graph of FIG. 2(b) (0.856 mol), it can be seen that the degradation was not only due to the above-described loss of available lithium but also due to the loss of positive electrode capacity.

Accordingly, it can be seen that, when the method of diagnosing a cause of degradation of a lithium secondary battery according to the present invention is used, a cause of degradation of a lithium secondary battery can be classified and quantified in a simple and non-destructive manner.

The invention claimed is:

1. A method of diagnosing a cause of degradation of a lithium secondary battery, comprising:
   (A) manufacturing a lithium secondary battery including a positive electrode including a layered positive electrode active material, a negative electrode, a separator interposed between the positive electrode and the negative electrode, and an electrolyte;
   (B) obtaining, from first X-ray diffraction data obtained during first charging of the lithium secondary battery, a first graph showing the change of the c-axis d-spacing value of the layered positive electrode active material according to a number of moles of lithium ions deintercalated from the layered positive electrode active material during the first charging;
   (C) obtaining, from second X-ray diffraction data obtained during second charging of the lithium secondary battery, a second graph showing the change of the c-axis d-spacing value of the layered positive electrode active material according to a number of moles of lithium ions deintercalated from the layered positive electrode active material during the second charging; and
   (D) classifying the cause of degradation of the secondary battery by comparing the first graph and the second graph.

2. The method of claim 1, wherein the cause of the degradation of the secondary battery is one or more of a loss of available lithium or a loss of positive electrode capacity.

3. The method of claim 1, wherein the step (D) includes:
   classifying the cause of the degradation of the secondary battery as the loss of available lithium when a maximum value of the number of moles of deintercalated lithium ions in the second graph is smaller than a maximum value of the number of moles of deintercalated lithium ions in the first graph; and
   after horizontally shifting the second graph in an x-axis direction so that the number of moles of deintercalated lithium ions corresponding to the maximum c-axis d-spacing value of the layered positive electrode active material in the second graph is the same as the number of moles of deintercalated lithium ions corresponding to the maximum c-axis d-spacing value of the layered positive electrode active material in the first graph, classifying the cause of the degradation of the secondary battery as a loss of positive electrode capacity when a sum of the maximum number of moles of deintercalated lithium ions in the second graph and a degree by which the second graph is horizontally shifted is greater than the maximum number of moles of deintercalated lithium ions in the first graph.

4. The method of claim 3, wherein the step (D) includes quantifying an amount of the loss of the available lithium as a value obtained by subtracting the maximum number of moles of deintercalated lithium ions in the second graph from the maximum number of moles of deintercalated lithium ions in the first graph.

5. The method of claim 4, wherein, determining that the degradation of the lithium secondary battery is due to the loss of the available lithium when a rate of the loss of the available lithium according to the following Equation 1 is 14% or more:

Rate of loss of available lithium=(Amount of loss of available lithium)/(Maximum number of moles of deintercalated lithium ions in first graph)× 100. [Equation 1]

6. The method of claim 3, wherein the step (D) includes quantifying an amount of the loss of the positive electrode capacity as a value obtained by subtracting the maximum number of moles of deintercalated lithium ions in the first graph from a sum of the maximum number of moles of deintercalated lithium ions in the second graph and a degree by which the second graph is horizontally shifted.

7. The method of claim 1, wherein the layered positive electrode active material is a lithium transition metal oxide including nickel at 60 mol % or more relative to a total number of moles of transition metals excluding lithium.

8. The method of claim 1, wherein the layered positive electrode active material is represented by the following Chemical Formula 1:

[Chemical Formula 1]

wherein, in Chemical Formula 1,
0≤a≤0.3, 0.6≤x≤1.0, 0≤y≤0.2, 0≤z≤0.2, and x+y+z=1, and
M is one or more of manganese or aluminum.

9. The method of claim 1, wherein the second charging is:
charging performed after discharging the lithium secondary battery subjected to the first charging and subsequently repeatedly charging and discharging the lithium secondary battery for one or more cycles; or
charging performed after discharging the lithium secondary battery subjected to the first charging and subsequently storing the lithium secondary battery for a long period of time at a temperature of −20° C. to 70° C.

10. The method of claim 1, wherein the first charging and the second charging are performed in a voltage range of 2.5 V to 4.2 V.

11. The method of claim 1, wherein the X-ray diffraction data is obtained using a transmission X-ray diffraction analyzer.

12. The method of claim 1, wherein the d-spacing value is a d-spacing value in the (003) plane of the layered positive electrode active material.

* * * * *